United States Patent [19]

Henderson et al.

[11] Patent Number: 5,352,495
[45] Date of Patent: Oct. 4, 1994

[54] TREATMENT OF A SURFACE BY LASER ENERGY

[75] Inventors: Andrew R. Henderson; Robert Jones, both of Cambridge, England

[73] Assignee: The Wiggins Teape Group Limited, Basingstoke, United Kingdom

[21] Appl. No.: 721

[22] Filed: Jan. 6, 1993

Related U.S. Application Data

[63] Continuation of Ser. No. 863,321, Apr. 1, 1992, abandoned, which is a continuation of Ser. No. 480,793, Feb. 16, 1990, abandoned.

[30] Foreign Application Priority Data

Feb. 16, 1989 [GB] United Kingdom ................. 8903525

[51] Int. Cl.$^5$ .............................................. B05D 3/06
[52] U.S. Cl. ..................... 427/596; 427/554; 427/555
[58] Field of Search .................... 156/643; 219/121.61, 219/121.66, 121.69, 121.5; 427/554, 555, 556, 596, 597

[56] References Cited

U.S. PATENT DOCUMENTS

| | | | |
|---|---|---|---|
| 3,186,861 | 6/1965 | Smith et al. | 117/36.1 |
| 3,256,524 | 6/1966 | Stauffer | 346/76 |
| 3,488,102 | 1/1970 | Buck et al. | 350/7 |
| 3,509,249 | 4/1970 | Molines et al. | 250/214 |
| 3,584,963 | 6/1971 | Wisner | 356/237 |
| 3,702,094 | 11/1972 | Sinnott et al. | 95/4.5 |
| 3,821,753 | 6/1974 | Sinnott et al. | 95/4.5 |
| 3,827,063 | 7/1974 | Sinnott et al. | 95/4.5 R |
| 3,943,324 | 3/1976 | Haggerty | 219/121 L |
| 3,958,253 | 5/1976 | Rueckmann | 346/76 L |
| 3,969,684 | 7/1976 | de Witte et al. | 372/100 |
| 4,024,545 | 5/1977 | Dowling et al. | 346/76 L |
| 4,027,330 | 5/1977 | Maslowski et al. | 369/279 |
| 4,057,784 | 11/1977 | Tafoya | 340/146.3 F |

(List continued on next page.)

FOREIGN PATENT DOCUMENTS

| | | |
|---|---|---|
| 0021165 | 1/1981 | European Pat. Off. . |
| 0027698 | 4/1981 | European Pat. Off. . |
| 0047604 | 3/1982 | European Pat. Off. . |
| 0042173 | 10/1982 | European Pat. Off. . |
| 0098013 | 1/1984 | European Pat. Off. . |
| 0119034 | 9/1984 | European Pat. Off. . |
| 2820462 | 3/1979 | Fed. Rep. of Germany . |
| 3431577 | 3/1986 | Fed. Rep. of Germany . |
| 3418188 | 9/1987 | Fed. Rep. of Germany . |
| 2158921 | 6/1973 | France . |
| 59-157612 | 1/1985 | Japan . |
| WO87/05850 | 10/1987 | PCT Int'l Appl. . |
| 0972071 | 10/1964 | United Kingdom . |
| 0998711 | 7/1965 | United Kingdom . |
| 1012430 | 12/1965 | United Kingdom . |
| 1036627 | 7/1966 | United Kingdom . |
| 1128616 | 9/1968 | United Kingdom . |
| 1249138 | 10/1971 | United Kingdom . |
| 1405487 | 9/1975 | United Kingdom . |

(List continued on next page.)

*Primary Examiner*—Marianne Padgett
*Attorney, Agent, or Firm*—Burns, Doane, Swecker & Mathis

[57] ABSTRACT

In treating the surface of a material with laser energy by sweeping a laser beam over the surface, a substantial uniformity of energy delivery is achieved across a major portion of the transverse width of the beam by using an unfocussed beam of a ring mode configuration and preferably one having an outer ring with at least some degree of interior fill as is achieved by a laser beam continuing $TEM_{00}$ and $TEM_{01}*$ modes. The specification discusses various beam configurations. The specification introduces the concept of "exposure integration" which is a function not only of the beam profile in the sweep direction but of the rate of sweep. An exposure duration for any scanned point of not more than 10 milliseconds is suggested. The application of the invention is particularly described with reference to marking the surface of paper.

22 Claims, 8 Drawing Sheets

U.S. PATENT DOCUMENTS

| | | | |
|---|---|---|---|
| 4,118,619 | 10/1978 | McArthur et al. | 219/121 L |
| 4,121,595 | 10/1978 | Heitmann et al. | 219/121 L |
| 4,160,913 | 7/1979 | Brenholdt | 250/563 |
| 4,240,448 | 12/1980 | Heitmann et al. | 219/121 L |
| 4,275,288 | 6/1981 | Makosch et al. | 219/121.75 |
| 4,302,654 | 11/1981 | Bennett et al. | 219/121 LL |
| 4,356,375 | 10/1982 | Josephy et al. | 219/121 LH |
| 4,378,480 | 3/1983 | Langhans | 219/121 LK |
| 4,397,483 | 8/1983 | Hiraishi et al. | 282/27.5 |
| 4,401,992 | 8/1983 | Vorst et al. | 346/76 L |
| 4,424,519 | 1/1984 | Neumann et al. | 346/108 |
| 4,456,811 | 6/1984 | Hella et al. | 219/121.6 |
| 4,467,168 | 8/1984 | Morgan et al. | 219/121.67 |
| 4,496,961 | 1/1985 | Devrient | 427/150 |
| 4,499,361 | 2/1985 | Brinker | 219/121 LK |
| 4,499,362 | 2/1985 | Martin | 219/121 LA |
| 4,507,535 | 3/1985 | Bennett et al. | 219/121 LL |
| 4,519,680 | 5/1985 | Grollimund | 350/486 |
| 4,537,809 | 8/1985 | Ang et al. | 219/121 LG |
| 4,566,938 | 1/1986 | Jenkin et al. | 427/531 |
| 4,568,815 | 2/1986 | Kimbara et al. | 219/121 LK |
| 4,612,555 | 9/1986 | Hongon et al. | 346/160 |
| 4,612,556 | 9/1986 | de Moira | 427/150 |
| 4,672,625 | 6/1987 | Sheng | 372/99 |
| 4,740,269 | 4/1988 | Berger et al. | 156/643 |
| 4,772,798 | 9/1988 | Craig | 250/353 |
| 4,824,691 | 4/1989 | Townsend | 427/53.1 |
| 4,874,919 | 10/1989 | Bransden et al. | 219/121.68 |
| 4,961,080 | 10/1990 | Henderson et al. | 345/108 |
| 5,190,791 | 3/1993 | Günter et al. | 427/596 |

FOREIGN PATENT DOCUMENTS

| | | |
|---|---|---|
| 1409653 | 10/1975 | United Kingdom . |
| 1545933 | 5/1979 | United Kingdom . |
| 2022492 | 12/1979 | United Kingdom . |
| 2022987 | 12/1979 | United Kingdom . |
| 2027628 | 2/1980 | United Kingdom . |
| 2032323 | 5/1980 | United Kingdom . |
| 2032325 | 5/1980 | United Kingdom . |
| 1569725 | 6/1980 | United Kingdom . |
| 2044175 | 10/1980 | United Kingdom . |
| 1588980 | 5/1981 | United Kingdom . |
| 2074341 | 10/1981 | United Kingdom . |
| 1602133 | 11/1981 | United Kingdom . |
| 1603752 | 11/1981 | United Kingdom . |
| 2074493 | 11/1981 | United Kingdom . |
| 2094211 | 9/1982 | United Kingdom . |
| 2101029 | 1/1983 | United Kingdom . |
| 2113142 | 8/1983 | United Kingdom . |
| 2118882 | 11/1983 | United Kingdom . |
| 2126955 | 4/1984 | United Kingdom . |
| 2127567 | 4/1984 | United Kingdom . |
| 2131767 | 6/1984 | United Kingdom . |
| 2133352 | 7/1984 | United Kingdom . |
| 2137068 | 10/1984 | United Kingdom . |
| 2143649 | 2/1985 | United Kingdom . |
| 2144873 | 3/1985 | United Kingdom . |
| 2149644 | 6/1985 | United Kingdom . |
| 2155754 | 10/1985 | United Kingdom . |
| 2161752 | 1/1986 | United Kingdom . |
| 2170504 | 8/1986 | United Kingdom . |
| 2173452 | 10/1986 | United Kingdom . |

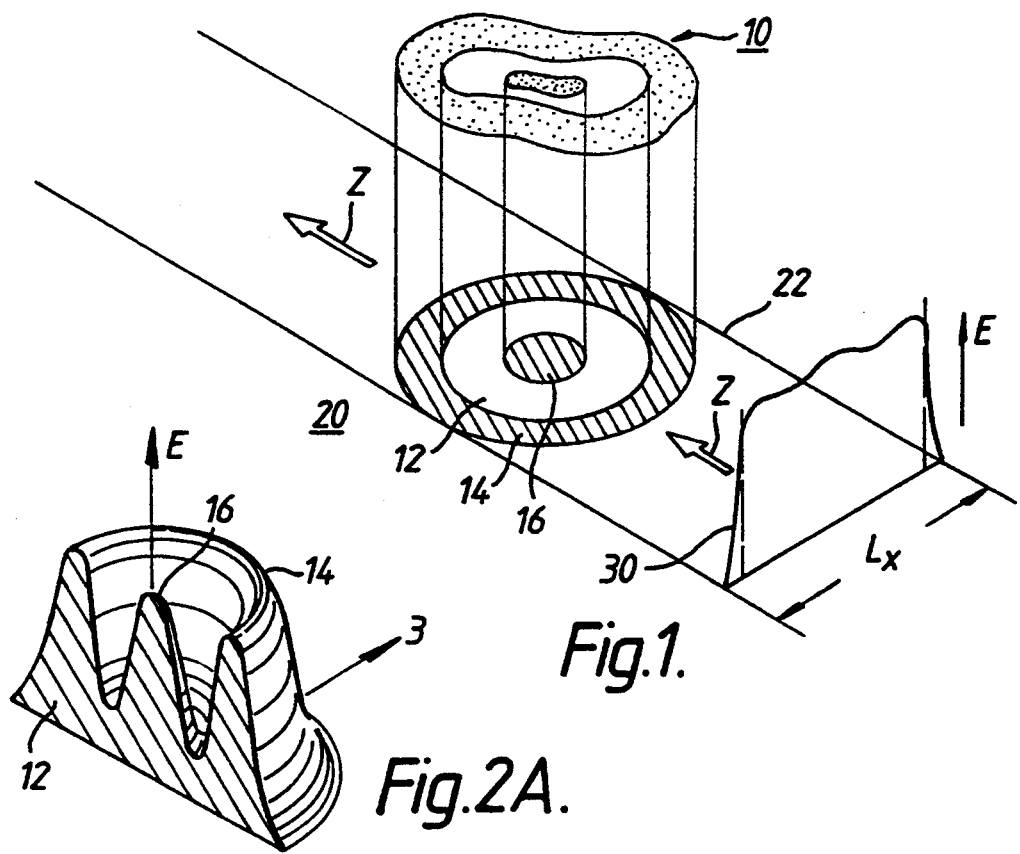
Fig.1.
Fig.2A.
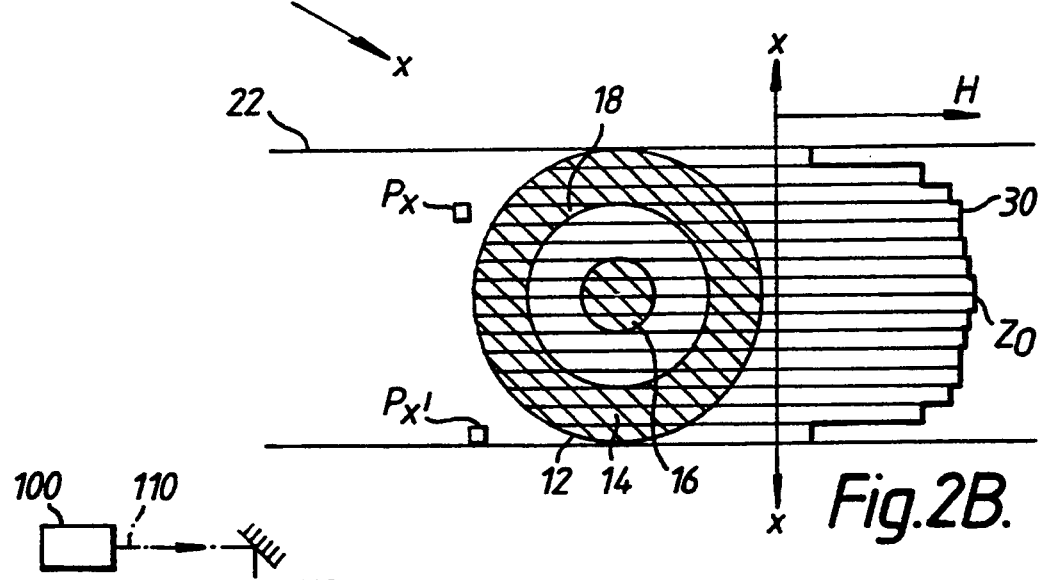
Fig.2B.
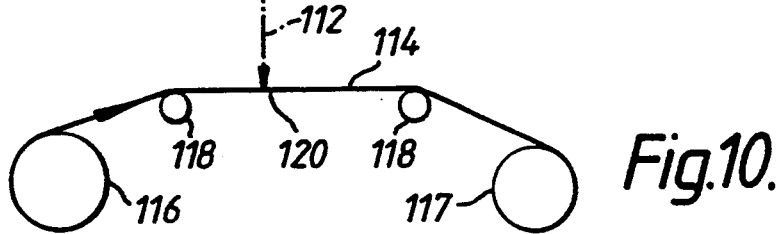
Fig.10.

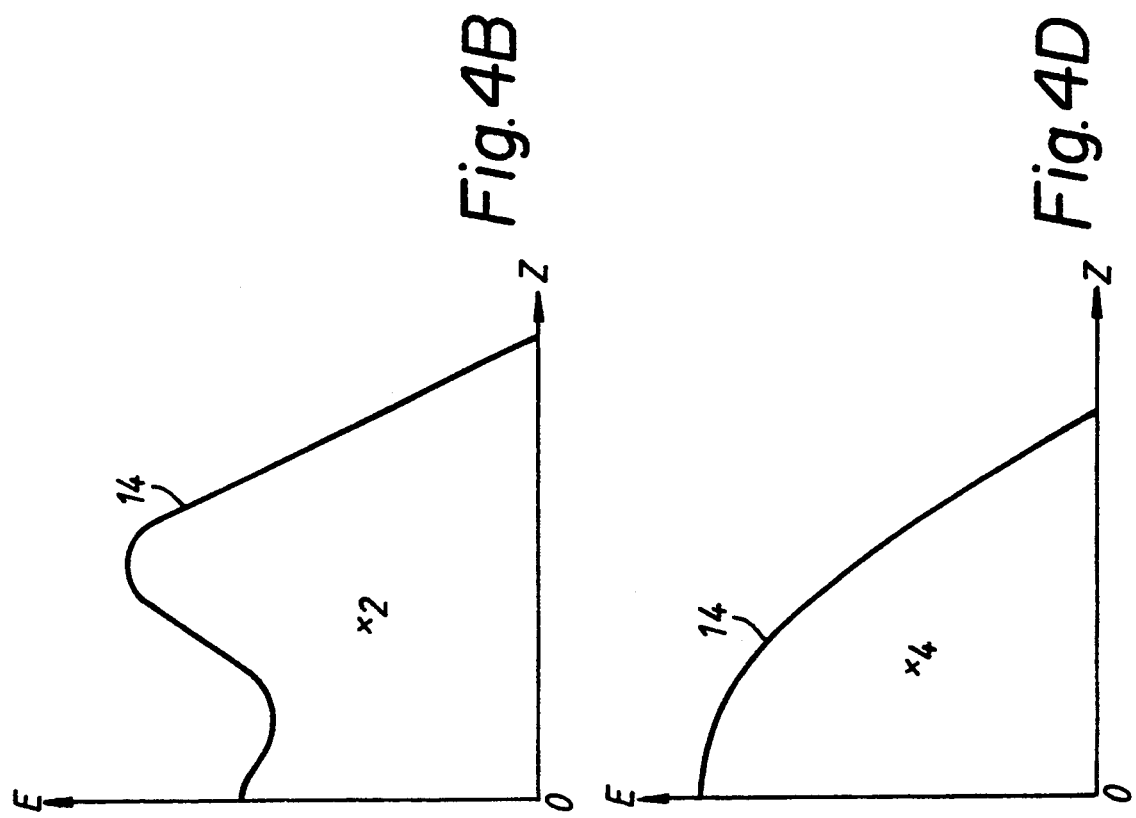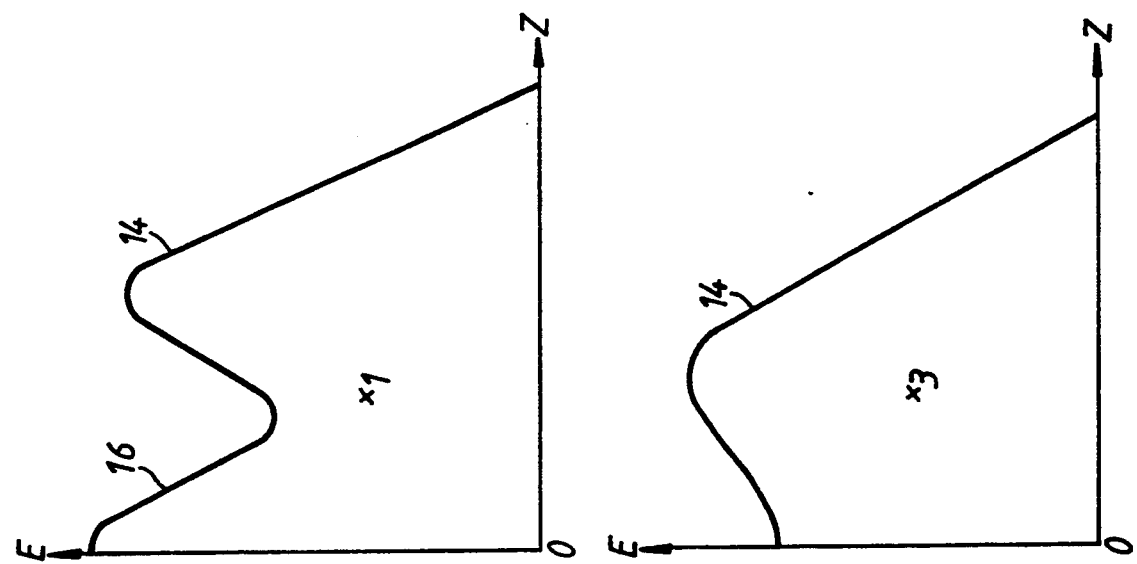

TREATMENT OF A SURFACE BY LASER ENERGY

This application is a continuation of application Ser. No. 07/863,321, filed Apr. 1, 1992, which is a continuation of application Ser. No. 07/480,793, filed Feb. 16, 1990, both now abandoned.

FIELD OF THE INVENTION

This invention relates to the treatment of the surface of a material by laser energy and is concerned with a method and apparatus for such treatment. One particular application of the invention is to the marking of the surface of a web of paper by application thereto of laser energy. Such marking may be the application to the web of a repeated logo or other visual mark short of perforating the web or producing an undue charring of the paper that would be aesthetically unacceptable. However, the principles of the invention are considered to be of more general utility in cases where a surface of a material is treated by scanning a laser beam thereover to effect a change at the surface. Such change may or may not be visible.

One such use of laser energy involves the scanning of a beam relative to the web surface to produce a "mark" having both length in the scanning direction and a significant width transverse to this direction. The width may be several millimeters. The mark, logo or whatever applied to the material surface may be made with the aid of a mask or stencil and should present a uniform appearance. This requires seeking a uniformity of effect from the delivery of the scanning laser energy.

BACKGROUND TO THE INVENTION

An example of marking a paper web by a laser beam with the aid of an image-bearing mask is disclosed in European patent specification EP-A 0279505. In this specification, it is shown how a laser beam may be brought to a line focus, the line extending the required width in the direction transverse to the scan direction. In the embodiments disclosed in that specification the mask is scanned past the fixed line provided by the beam.

Copending European patent application 89301486.0 filed Feb. 16, 1989 and published under the number EP-A 0329438 on Aug. 23, 1989 discloses another arrangement using a laser beam for marking a web with the aid of a mask or stencil. In this case an unfocussed, but collimated, laser beam is employed. The beam has a cross-section whose diameter satisfies the width requirement of the image transverse to the direction of scan.

The present invention has arisen out of work done in investigating the uniformity of marking obtained when a laser beam is scanned relative to the surface of a material, and more particularly the uniformity in the direction normal to the scan direction. More generally this has led to the consideration of obtaining a uniform treatment of the surface or surface zone of a material by scanning a laser beam thereover in which energy is applied over a significant width transverse to the scan direction.

At the same time as seeking to achieve this uniformity, it is desirable to achieve an efficient utilisation of the beam and to avoid having to use a laser of unduly excessive power. Take for example, a beam having a simple circularly symmetrical, Gaussian distribution, i.e. a $TEM_{00}$ mode beam. It has a high central peak of irradiance rapidly dropping to low irradiance levels away from the centre. It will be readily appreciated that the strip irradiated by such a beam on sweeping a surface will receive a far greater total exposure where the peak sweeps than at the lateral margins. More uniform exposure can be achieved by truncating the beam—that is masking off the lateral portions—to concentrate on the central area. This reduces the width of strip treated as well as wasting a substantial portion of the beam power. If the beam diameter is increased to make up for the lost width, then a higher power laser is required to achieve the same irradiance in the active portion of the beam.

We shall describe hereinafter how by proper selection of the operating mode of the laser, and specifically by use of a ring mode laser, it is possible to achieve a substantially uniform delivery of energy across a major proportion of the scanned width of an untruncated beam. That is to say that the efficiency of utilisation of the beam is good if the beam is truncated to the appropriate proportion; or put another way for a given width scanned, the required power of the laser may be kept to a minimum for the surface treatment required. More particularly, it has now been discovered that to achieve these desirable results the rate of scan of the beam should be such as to result in an integrated effect on the material treated to which the name "exposure integration" is given.

SUMMARY OF THE INVENTION

According to one aspect of the present invention there is provided a method of treating the surface of material with laser energy in which a laser beam is scanned relative to the surface, characterised in that:

the laser beam is unfocussed at the surface, the cross-section of the beam at the surface has a significant width transverse to the direction of scan, the cross-section of the beam at the surface exhibits an intensity distribution distinctive of the propagation mode structure of the beam, the mode structure comprises a ring mode, and the scanning velocity of the beam relative to the material is such that at any scanned point on the surface, the thermal energy generated is a function of the integral of the beam irradiance profile acting at that point as the beam traverses the point.

In another aspect of the invention, there is provided a method of treating the surface of material with laser energy in which a laser beam is scanned relative to the surface, characterised in that:

the laser beam is unfocussed at the surface, the cross-section of the beam at the surface has a significant width transverse to the direction of scan, the cross-section of the beam at the surface exhibits an intensity distribution distinctive of the propagation mode structure of the beam, the mode structure comprises a ring mode, and the scanning velocity of the beam relative to the material is such that at any scanned point on the surface, the exposure duration is sufficiently short to ensure that the point responds to the integrated energy derived from the beam irradiance profile acting at that point as the beam traverses the point.

The ring mode structure referred to in the above defined methods may be circularly symmetrical. Preferably the intensity distribution of the mode structure comprises an outer ring and a central peak. This mode structure may be achieved by the combination of TEM$_{00}$ and TEM$_{01}$* modes.

A specific application of the invention to the treatment or imaging of paper and the laser power used is below a level at which significant charring occurs. Present experience indicates that were the material is paper, the exposure duration should be not more than 10 milliseconds.

In yet another aspect of the invention, there is provided apparatus for treating the surface of a material with laser energy comprising:

a laser providing a beam with a ring mode structure, a material surface receiving location, means for directing the laser beam to said location as a non-focussed beam having a significant dimension in a predetermined direction, means for effecting a relative scanning motion between the beam and a material surface received at said location in a direction substantially normal to said predetermined direction, said scanning-effecting means providing a scanning velocity such that at any scanned point on the material surface, the thermal energy generated is a function of the integral of the beam irradiance profile acting at that point.

In the above apparatus the laser beam may be circularly symmetrical. A preferred ring mode structure has an outer ring encircling a central peak. This structure may be achieved by the combination of TEM$_{00}$ and TEM$_{01}$* modes.

Preferably for paper at least, the scanning-effecting means provides an exposure duration for any scanned point that is not more than 10 milliseconds.

BRIEF DESCRIPTION OF DRAWINGS

This invention and its practice will be further described with reference to the accompanying drawings in which;

FIG. 1 shows a laser beam scanning the surface of a material to be treated, and the profile of a diametric intensity distribution for the beam;

FIG. 2A shows a representation of the beam intensity as a three-dimensional figure;

FIG. 2B shows an energy distribution curve across the width of the strip on the surface scanned by the beam;

FIGS. 4A, 4B, 4C and 4D shows irradiance profiles for four different "slices" through the beam;

FIG. 10 shows one diagrammatic example of apparatus embodying this invention.

DESCRIPTION OF THE PREFERRED EMBODIMENTS

Figure 3B:
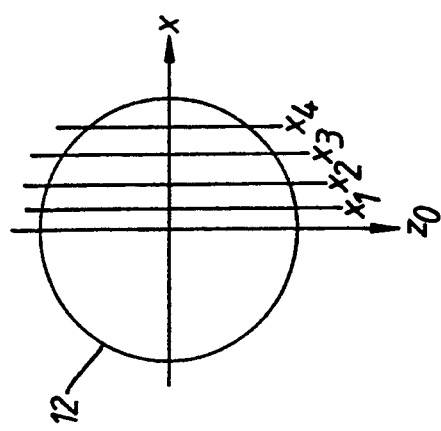
FIG. 3B illustrates the positions of the profiles illustrated in FIG. 4.

FIG. 1 shows a laser beam 10 sweeping across the surface 20 of a material to sweep a path 22 of width Lx, which in this example is equal to the diameter d of the beam. The beam is swept in the direction of arrows Z. The manner in which the relative movement between beam and the material surface is achieved is not relevant to this discussion. It is assumed the beam impinges substantially normally to the material surface. The beam may be utilized to apply a logo to the surface 20 by sweeping it across a mask or stencil such as that seen in FIG. 10 of EP-A 0279505. However, the following discussion is concerned generally with the energy delivered to points across the width of path 22.

The beam 10 illustrated is an example of a ring mode of operation of the laser source. The cross-section 12 of the beam is shown in a simplified form as having an outer peripheral ring 14 and an inner central peak 16. The irradiance distribution of the beam is circularly symmetrical in a cross-section through the beam and this form of beam can be realised by a laser operating in a TEM$_{00}$+TEM$_{01}$* mode. The TEM$_{00}$ mode produces the central peak, the TEM$_{01}$* mode produces the outer ring. A diametric beam integrated energy profile 30 is shown upstanding from path 22. The integrated energy distribution is illustrated and discussed more fully below. In this description the irradiance (power density) of the beam will be denoted by E (in W/m$^2$). The direction of beam sweep will be denoted by z and the transverse direction by x.

FIG. 2A illustrates one half of a typical irradiance distribution as a three-dimensional profile. The diametric slice taken across the profile is plotted in FIG. 3A. FIG. 2B shows the simplified beam cross-section 12 sweeping along path 22. To the right of the figure a curve is plotted in stepwise increments for the total energy density or radiant exposure H (in Joules/m$^2$) delivered to any point such as P$_x$ in the path of the beam lying at a distance x from the central longitudinal axis z$_o$. Because the beam is symmetrical, x=0 will be taken to lie on axis z$_o$ and distances x measured as offset distances from this axis: in some of the later description x is expressed as a fraction of beam radius. The energy delivered to any point P$_x$ —represented as a small area of finite width in the x direction—is proportional to the integral of the slice 18 in the z-axis direction through the beam irradiance distribution of FIG. 2A that traverses P$_x$ during the sweep. What curve 30 shows is that the energy delivered is remarkably uniform over a substantial proportion of the width Lx, i.e. the beam diameter d. The energy delivered only drops at the extremities where the profile slice acting on a point such P'x becomes almost tangential to the beam. It will be appreciated that the margins of the beam where the total energy delivered drops can be masked off to truncate the beam cross-section in the direction to that portion at which the near uniform energy delivery is obtained.

Figure 3A:
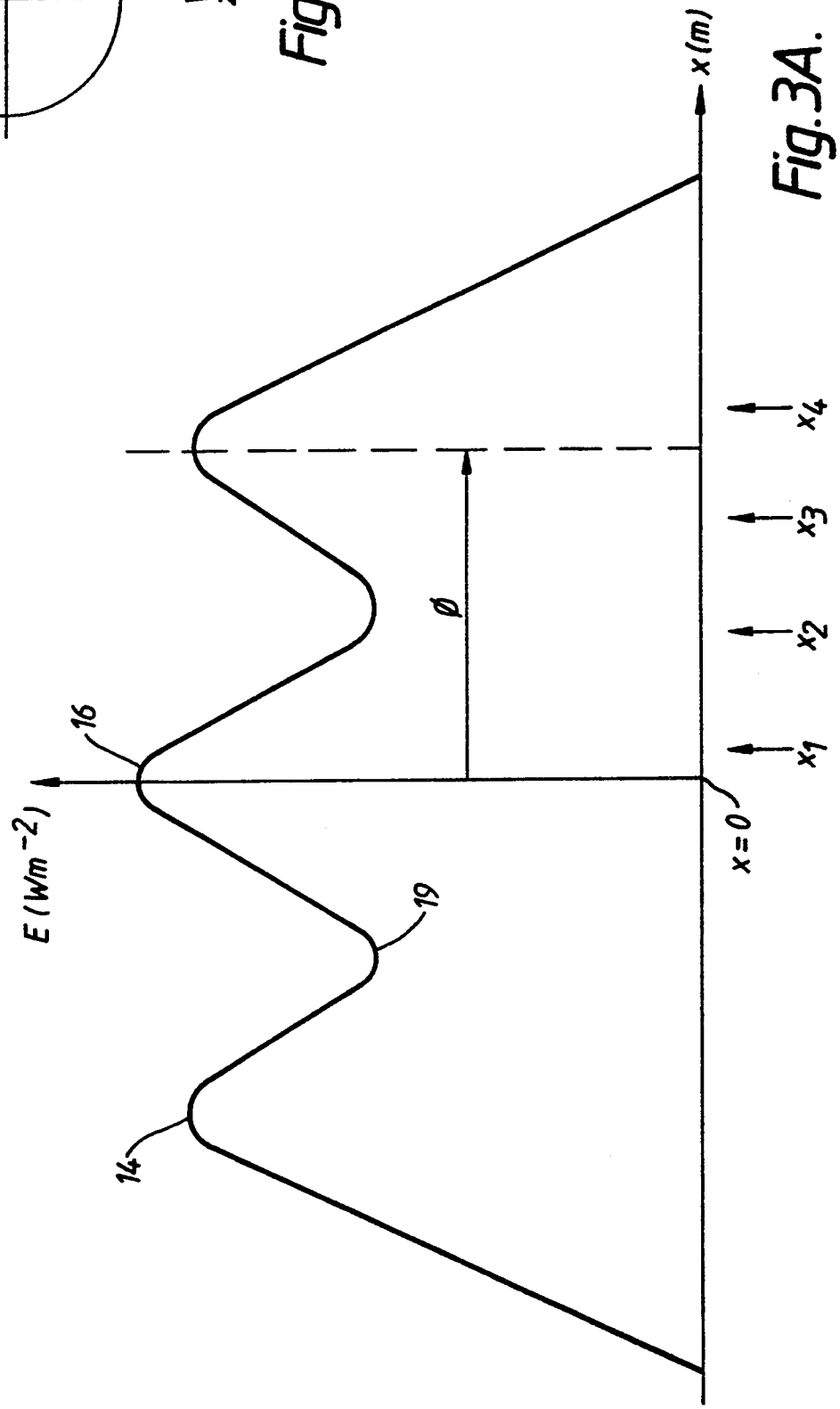
FIG. 3A shows a preferred irradiance profile for the laser beam.

Turning now to a more specific example, FIG. 3A shows a diametric slice through the beam irradiance (E) distribution for a combined TEM$_{00}$ and TEM$_{01}$* modes such as illustrated in FIG. 2A. The central peak 16 has an amplitude approximating the peak amplitude of the ring 14. The diameter of the peak of the outer ring is denoted $\phi$. In contrast to the simplified diagrams, it will be seen that the fall away of the central peak and of the outer ring from the peak values is such that between the two is a valley 19 whose minimum amplitude is still substantial. In the case illustrated it is somewhat in excess of half the peak value. The profile in FIG. 3A is for the irradiance of the beam along the diametric axis x in FIG. 3B.

FIGS. 4A to 4D show irradiance profiles taken along z-axis directed slices at distances $x_1$, $x_2$, $x_3$ and $x_4$ respectively from the central axis $z_0$ (x=0). These slices are shown in FIG. 3B. In fact what is shown in each case is a half-profile: the complete profile is symmetric about the diametric x-axis of FIG. 3B which lies at Z=0 in FIGS. 4A–D. As will be apparent from FIGS. 4A–D, the irradiance profile increasingly departs from that of FIG. 3A as x increases. It will also be noted that the extent of the profile in the z direction decreases with increasing x to become vanishingly small as x approaches the beam radius—the tangential condition. Thus any point $P_x$ at distances $x_1$, $x_2$, $x_3$ and $x_4$ will be scanned by the irradiance profile of FIG. 4A, 4B, 4C or 4D respectively, a central axis point being scanned by the profile of FIG. 3A.

Figure 5:
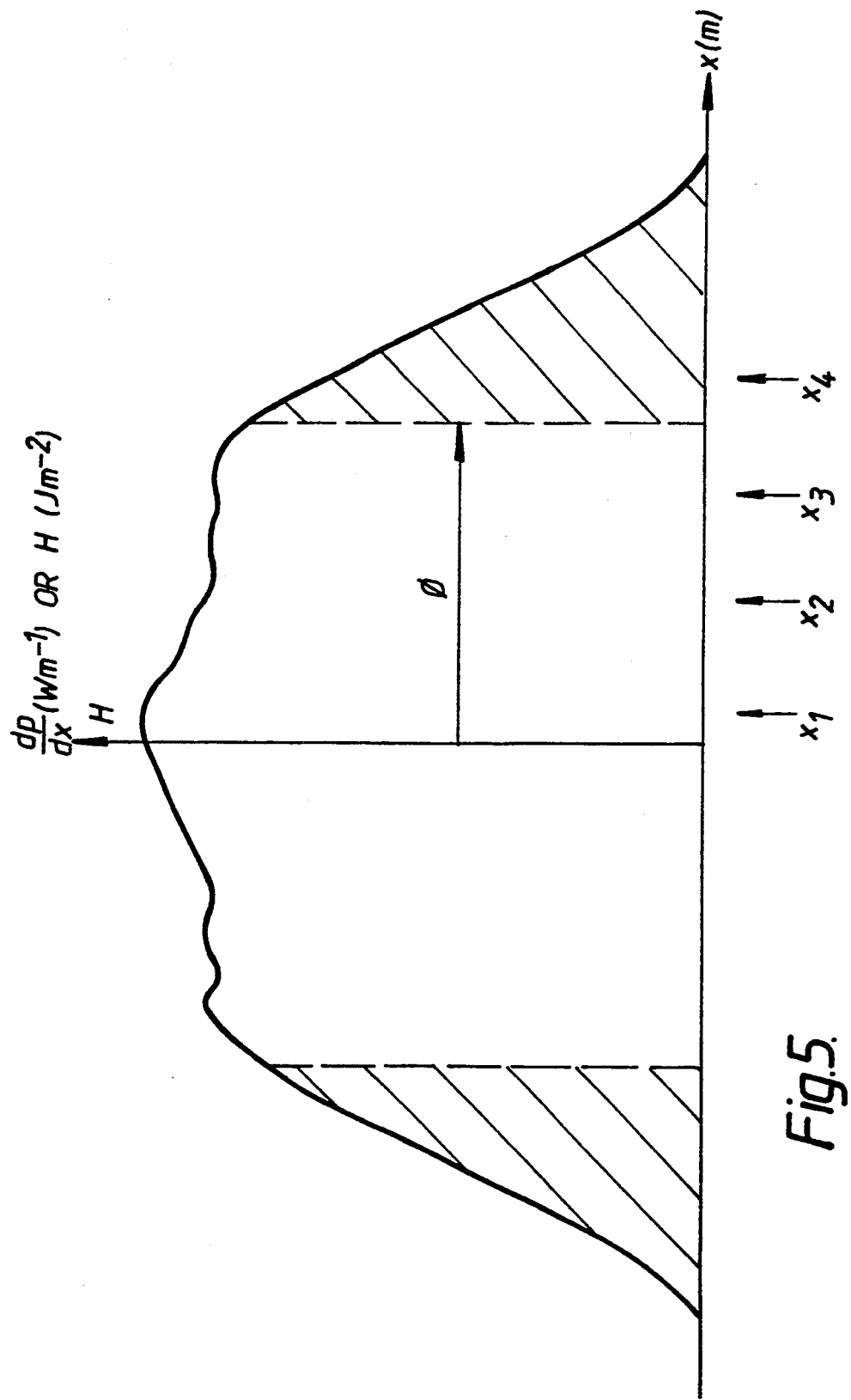
FIG. 5 is a graph showing the power distribution profile for the z-direction slices through a beam having the diametric irradiance profile of FIG. 3A.

The power available to act on a single point in the path of a profile slice at the distances $x_1$, $x_2$, $x_3$, $x_4$ etc. is illustrated in FIG. 5 in which the abscissa again represents x. The ordinate H is the integral of the slice profile in the z direction for each value of x and represents the power in the slice for an arbitrarily small slice width $\delta x$ (dP/dx) or alternatively can be expressed in terms of the radiant exposure (energy per unit area deliverable) in $J/m^2$ for a point at a distance Z from the central axis and scanned by the pertinent slice profile as the beam moves across the material surface at constant velocity. The total energy delivered will of course depend on the beam velocity, a factor to be discussed later.

Figure 6:
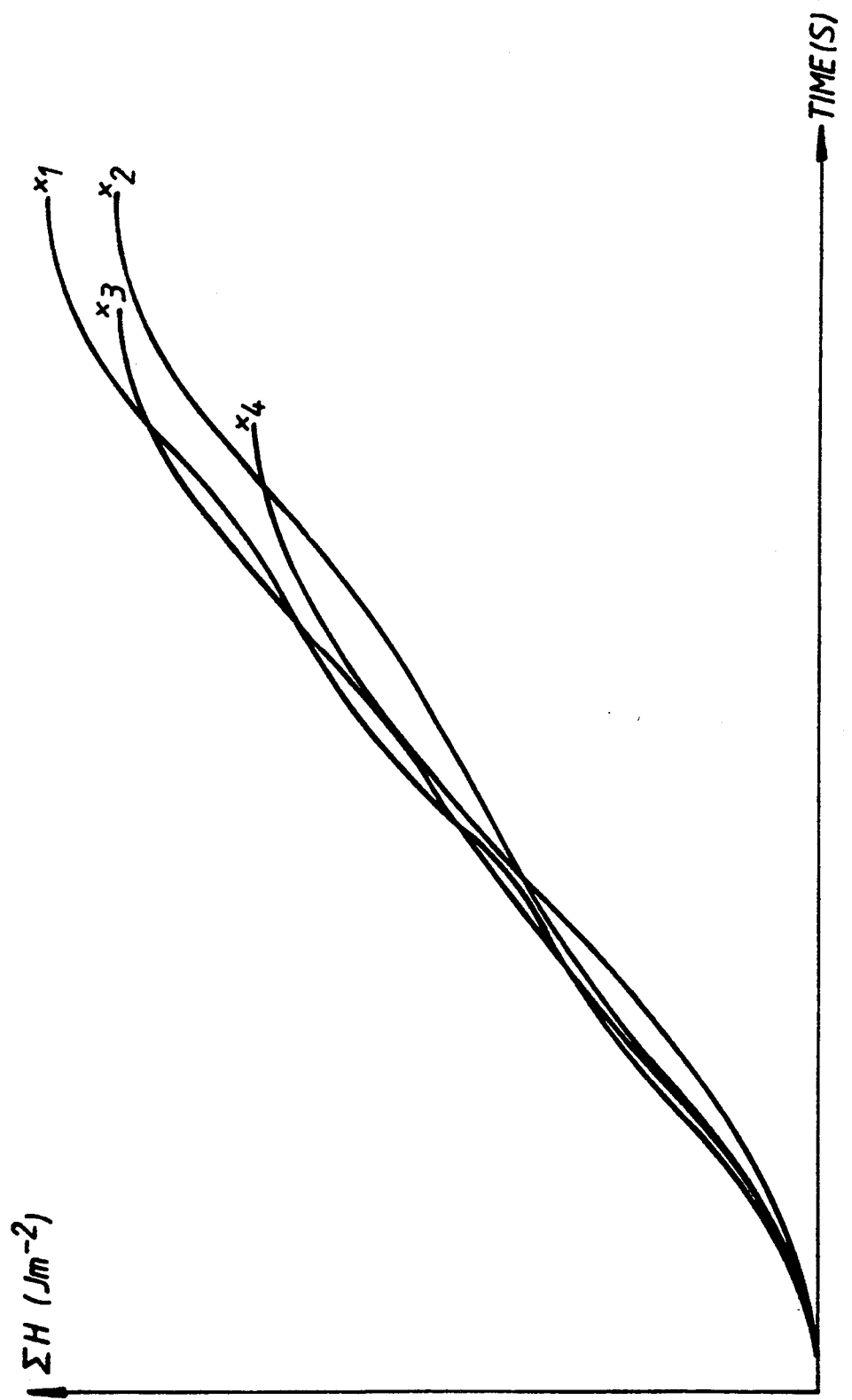
FIG. 6 is a graph showing the accumulation of radiant exposure as points on the surface are scanned with the slice irradiance profiles of FIGS. 4A to 4D.

The delivery of energy to points lying at the distances $x_1$, $x_2$, $x_3$ and $x_4$ is further illustrated in FIG. 6 which shows how the total energy, $\Sigma H$, accumulates with time as the beam is scanned. From FIGS. 5 and 6 it is seen that at distances $x_1$, $x_2$, $x_3$, all within the radius $\phi$, the energies delivered and the rate at which energy is delivered are closely comparable. At $x_4$ beyond the peak of the outer ring, the energy is beginning to fall significantly.

What the foregoing shows is that the ring mode laser beam illustrated is capable of delivering a substantially uniform amount of energy to a strip of material scanned by the beam, notwithstanding the apparently widely different irradiance values available in the beam cross-section. If a strip of material surface is to receive substantially the same energy, the beam can be truncated or masked in the x direction to remove the lateral margins. It is desirable that if this is done, the amount of beam power lost should not be too great. This can be expressed as truncation efficiency, that is the proportion of total beam power available when the lateral extent of the active beam is restricted to a given fraction of the diameter. The combined $TEM_{00}+TEM_{01}^*$ is considered favourable in this respect.

Figure 7:
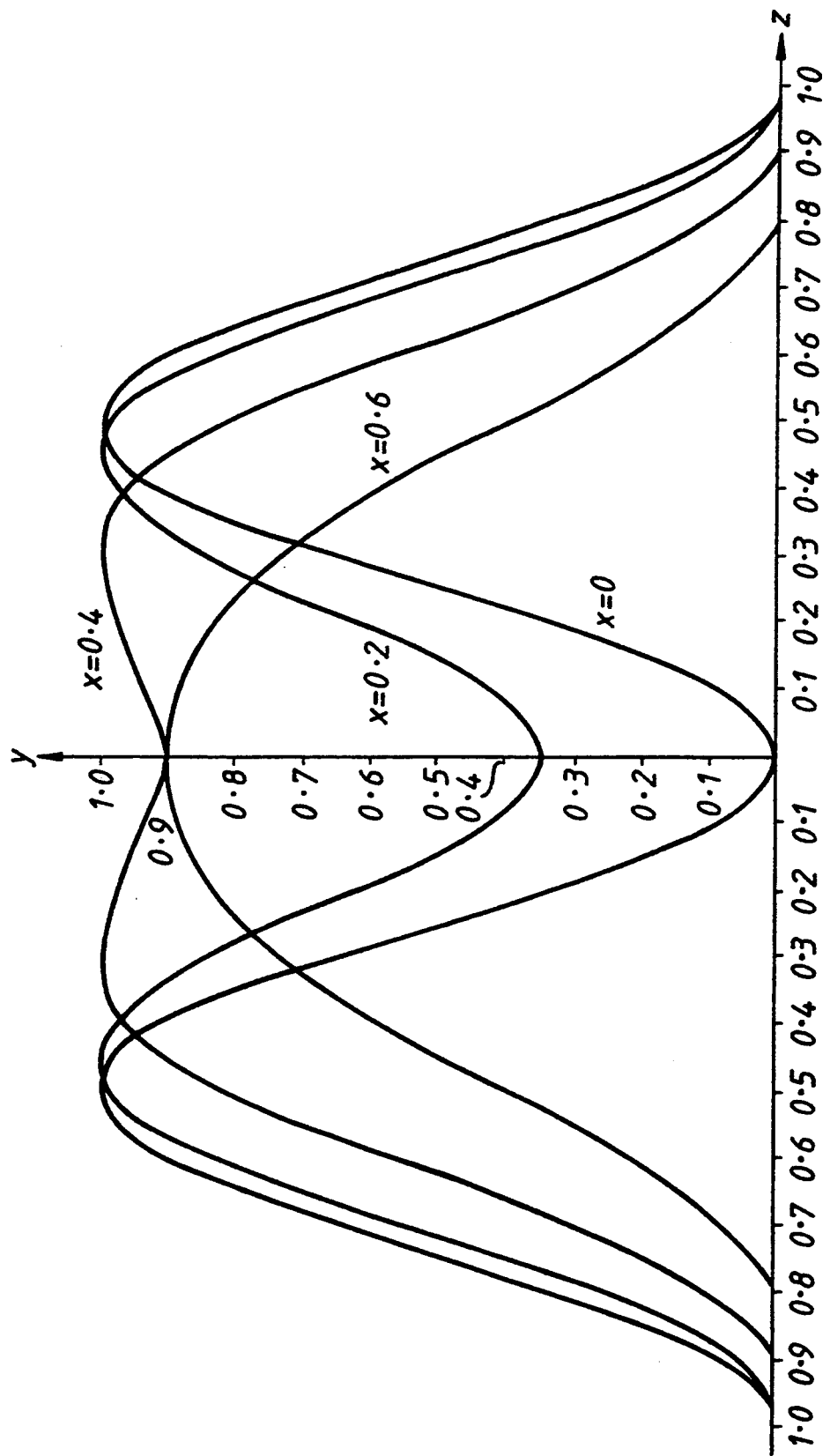
FIG. 7 shows slice profiles through a ring-mode beam having a central zero irradiance.
Figure 8:
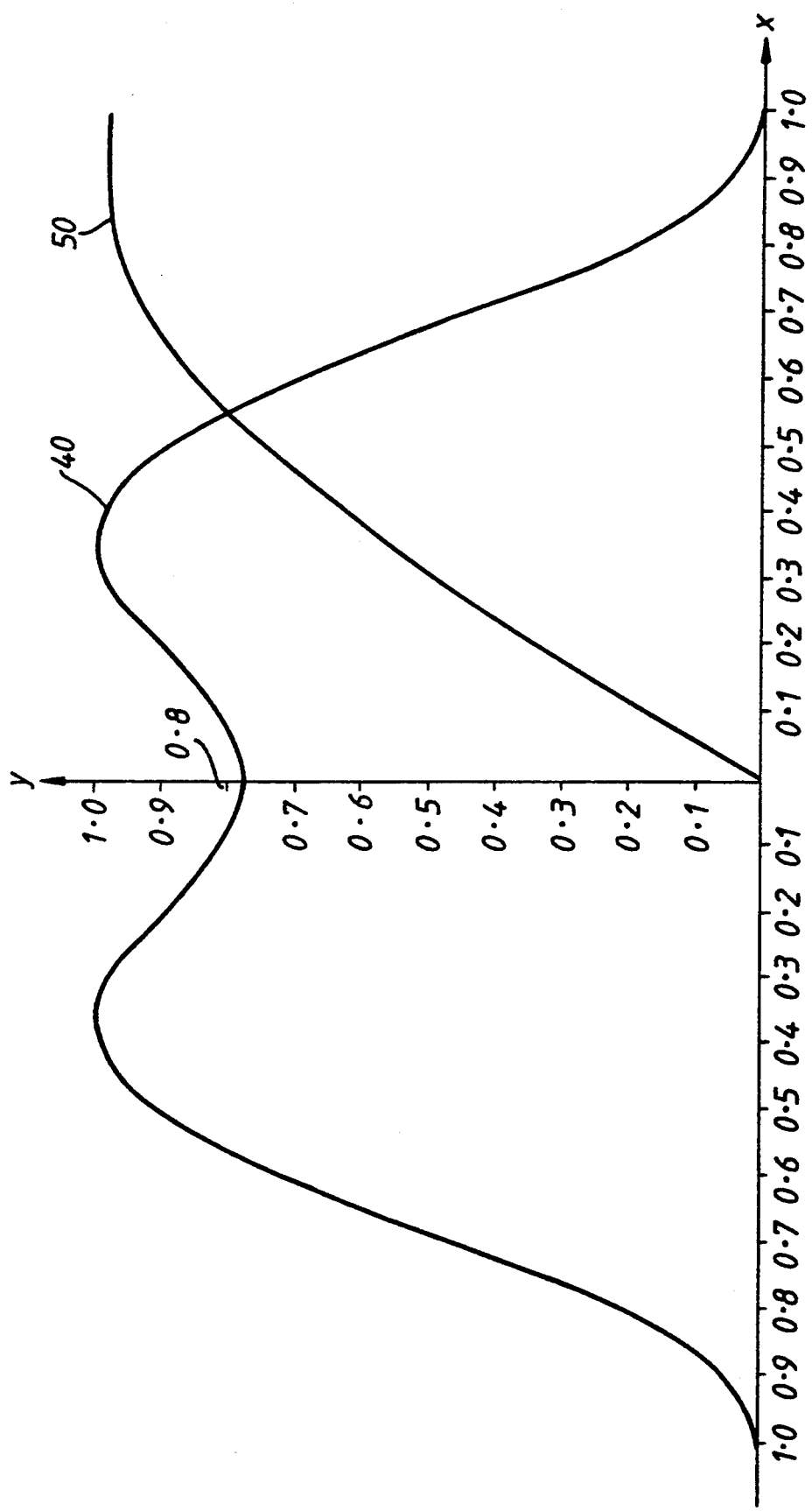
FIG. 8 is a graph similar to that of FIG. 5 for the beam of FIG. 7.

The analysis so far has considered the case where the central peak 16 does not exceed the peak of the outer ring 14 by any great amount. On one extreme is the case where the central peak entirely predominates, i.e. virtually a $TEM_{00}$ beam having a Gaussian distribution about its centre. This is no longer a ring mode. As has already been pointed out in the introductory portion of this specification, such a beam cannot combine efficient beam utilisation with uniform energy delivery to a strip of material. At the other extreme, the beam can virtually lose the central peak to just leave the outer ring. FIG. 7 shows a set of profiles in the z-axis direction for a $TEM_{01}^*$ mode beam with a centre or on-axis zero. Profiles are taken for x values of 0, 0.2, 0.4 and 0.6 expressed as a fraction of beam radius, the irradiance value on the y-axis being normalized to unity for the peak value. The energy deliverable along profile slices in the z-direction (also expressed as a fraction of beam radius) or to put it in other words, the power contained in slices of a width $\delta x$, is illustrated as curve 40 in FIG. 8 which is plotted in the same terms as, and should be compared with, FIG. 5. The y-axis scale in FIG. 8 is normalised to unity at the peak value. Instead of the slight peak on the axis $z_0$ in FIG. 5, FIG. 8 shows a dip on the zero axis, though for values of x to about 0.55 the uniformity of radiant exposure is about $\pm 10\%$ taking the 0.9 ordinate value as the datum. The variation in exposure acceptable will depend on the particular application but the figure quoted is one presently considered reasonable, particularly in the light of experience in marking paper. It is clear, however, that a $TEM_{00}$ mode component is of benefit in obtaining a more uniform energy distribution.

FIG. 8 also shows a curve 50 which represents the truncation efficiency expressed as a fraction on the y-axis. In accord with the definition given above this is the fraction of beam power allowed through a slit of width 2x (beam diameter is 2) whose longitudinal axis lies on the $z_0$ axis: that is the curve 50 as plotted shows the fractional truncational efficiency for a slit of half-width x. The truncation efficiency at the x=0.55 value just discussed is 0.8.

Figure 9:
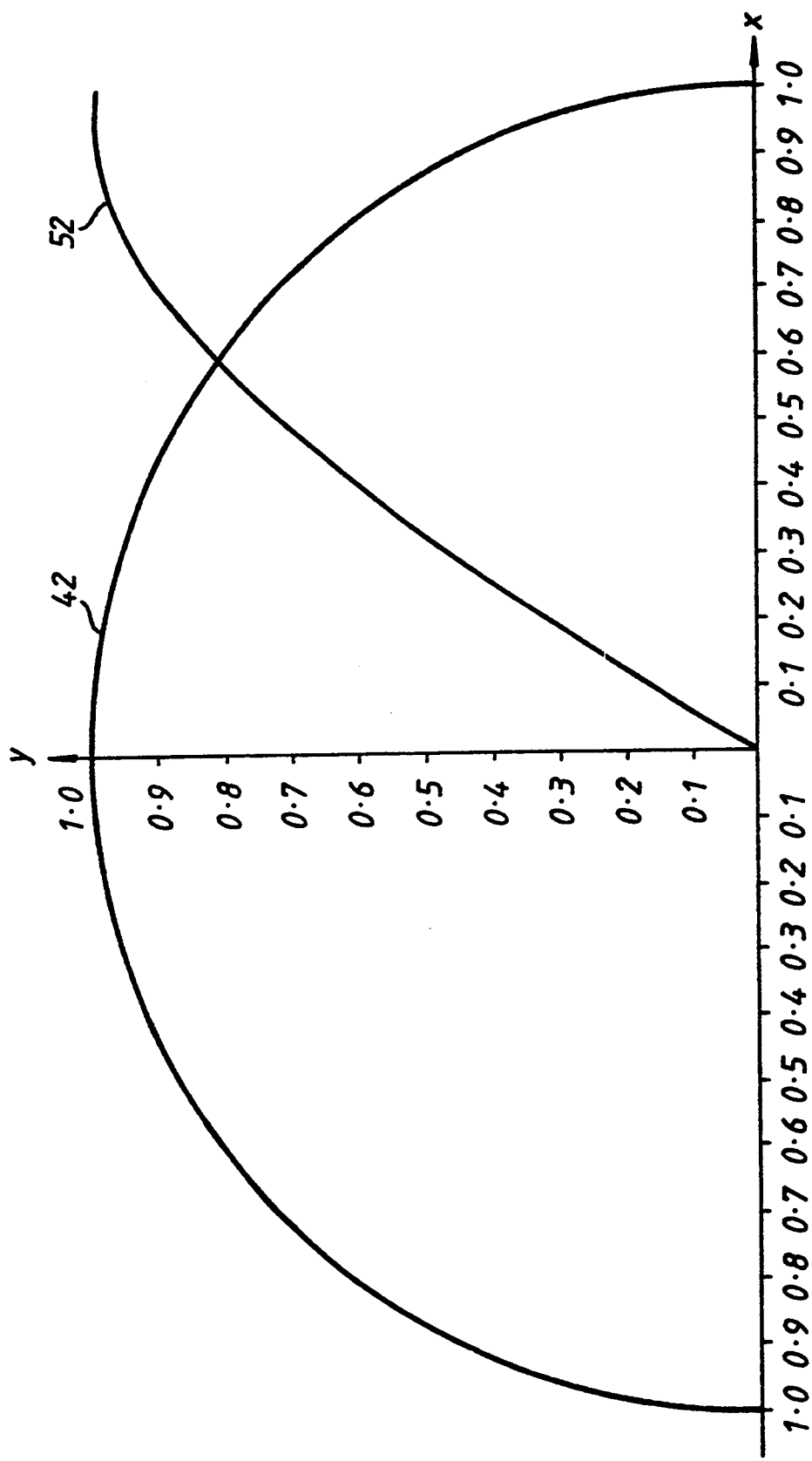
FIG. 9 shows a graph similar to that of FIGS. 5 and 8 for a beam having a theoretical "top-hat" profile.

To further explore the limits of usable beam profiles, consider a theoretical profile which can be termed a "top-hat" profile. In a representation of the kind seen in FIG. 2A this profile would be a right cylinder of radius d and in a diametric profile of the kind shown in FIG. 3A would have a rectangular (flat top) profile across the full-beam diameter. FIG. 9 shows in curve 42 the power contained in slice profiles as is done in FIG. 8, and in curve 52 the truncation efficiency. For a truncated beam having the same $\pm 10\%$ radiant exposure about the same 0.9 datum as in FIG. 8, the slit half-width is slightly greater at 0.6, so it is a little more efficient in beam utilisation. For comparison, the embodiment of FIGS. 2 and 3 provides a truncation efficiency of about 85% for a slit half-width slightly greater than 0.6.

All the examples illustrated are ring modes. The single outer ring with centre zero is the simplest case. The top-hat profile is more akin to the combined $TEM_{00}+TEM_{01}^*$ analysed earlier but with a uniform fill across the whole beam. It is possible to generate multimode beams comprising large numbers of higher-order modes which have a central circular plateau, albeit with secondary peaks imposed on this and without of course, having exactly vertical edges. What has emerged from the investigation made so far is that in addition to the ring mode itself, a central peak is beneficial: where there is a central intensity peak, the value of it should preferably be about that of the outer ring or not much in excess of it to obtain a reasonably uniform energy delivery across a major proportion of the beam width transverse to the scan direction.

The foregoing analysis of various beam profiles has demonstrated the capability of ring modes to deliver a substantially uniform amount of energy to points along the strip of material traversed by the beam over a major proportion of the beam diameter. However, it is necessary for the scanning velocity of the beam to be sufficient to achieve exposure integration. This will now be further explained.

If we take the presently preferred kind of profile such as shown in FIG. 2A ($TEM_{00}+TEM_{01}*$), it is necessary that the beam sweep at a velocity such that the material surface does not respond to the fine structure of the beam profile. Investigation has shown that at low speeds paper responds to the rate of energy delivery, and for example along the $z_o$ axis would respond to the three peaks of the profile of FIG. 3A. In order to have the paper respond to the integrated energy, such as shown at 30 in FIG. 2B and in greater detail in FIGS. 5 and 6, it is considered necessary to have an exposure duration less than about 10 milliseconds. This has been specifically investigated on a paper having a weight of about 50 g/m$^2$. The exposure duration is the time for which a point swept by the beam is exposed to the pertinent slice profile. The maximum exposure duration is thus along the $z_o$ axis where the profile is the full beam diameter d. The scanning velocity must therefore be in excess of d/10 m/s, where d is in mm., which is about 80 m/s in the present case.

In general in considering the exposure duration, it is required that, in the time taken for the beam to sweep across any given point on the surface of the material being treated, significant thermal relaxation effects should not have occurred, and that therefore the material responds to the total energy delivery rather than to the rate of delivery (power) during the exposure period.

In the case of marking paper which has been particularly discussed, we are concerned with the conversion of the impinging radiant energy to thermal energy which then produces an effect in a surface-adjacent zone of the material. Paper is fibrous and has a highly open structure as seen at the laser wavelength. Light will be multiply scattered by the fibres near the surface as it penetrates into the open structure and is relatively gradually absorbed and converted to heat. In addition paper is a complex material. In particular its fibrous structure can be expected to include a few percent by weight of moisture even if the paper is notionally dry. Thus any heat generated will in part at least act to drive off this water before the heat will much affect the cellulose.

In the sort of marking application mentioned earlier, the heat generated by the impinging laser beam is believed to alter the fibrous structure in some way, perhaps as a result of first evaporating moisture, before any charring of the fibres begins. This alteration of the fibrous structure may itself produce a visible mark. There may then follow a charring of the fibres but without burning them away. It has been found that by the application of exposure integration as described in this specification it has proved possible to provide a logo or similar mark on a paper web which has a good uniform, visual appearance without being unduly pronounced.

FIG. 10 diagrammatically illustrates one apparatus for generating a laser beam to sweep a material surface such as shown in FIGS. 1, 2 and 2A. In FIG. 10 a laser 100 is used to generate a beam 110 that is directed along a beam path 112 to a web path 114. A material such as a paper web is transported along this path from say one reel 116 to another 117 with appropriate rollers 118 as will be understood in the art. The path could be within a papermaking machine. The beam 110 impinges on the web path 114 and longitudinally scans the path by virtue of the web transport. The beam impinging on the web at location 120 is the unfocussed, collimated beam of ring mode structure discussed above.

The beam may be used with an imaging mask, which may involve applying an optical scanning motion to the beam itself. The use of such image scanning for marking a moving web with an unfocussed, collimated, laser beam is described in EP-A 0329438 mentioned above.

We claim:

1. A method of treating the surface of a paper material with laser energy comprising the steps of providing a relative scanning movement between a surface and an axis of a laser beam in a scan direction where:
   the laser beam is unfocussed at the surface,
   the beam has a cross-section at the surface with a width transverse to the direction of scan,
   the cross-section of the beam at the surface comprises a ring-shaped propagation mode and exhibits an irradiance distribution distinctive of the propagation mode structure of the beam, and
   relatively moving the beam and the surface in the scan direction such that a scanning velocity of the beam relative to the surface is such that at any scanned point on the surface, thermal energy is generated which is a function of an integral of the beam irradiance distribution acting at that point as the beam traverses that point.

2. The method as claimed in claim 1 in which said ring mode structure is circularly symmetrical.

3. The method as claimed in claim 2 in which the irradiance distribution of said mode structure comprises an outer ring and a central peak.

4. The method as claimed in claim 3 in which the mode structure comprises a combination of $TEM_{00}$ and $TEM_{01}*$ modes.

5. The method as claimed in claim 1 in which the laser beam operates at a power below a level at which significant charring occurs.

6. The method as claimed in claim 1 in which the duration of laser beam exposure is not more than 10 milliseconds.

7. The method as claimed in claim 1 wherein beam width transverse to the scan direction and beam length in the scan direction are essentially the same.

8. The method as claimed in claim 1 wherein beam width transverse to the direction of scan is greater than a millimeter.

9. The method as claimed in claim 1 wherein the scanning velocity is selected such that the material surface is free of response to peaks of the propagation mode structure of the beam profile.

10. The method as claimed in claim 9 wherein the scanning velocity is selected such that the beam profile has a duration at the point of less than about 10 milliseconds.

11. A method of treating the surface of a paper material with laser energy comprising the steps of providing a relative scanning movement between a surface and an axis of a laser beam in a scan direction where:
    the laser beam is unfocussed at the surface,
    the beam has a cross-section at the surface with a width transverse to the direction of scan,
    the cross-section of the beam at the surface comprises a ring-shaped propagation mode and exhibits an irradiance distribution distinctive of the propagation mode structure of the beam, and
    relatively moving the beam and the surface in the scan direction such that a scanning velocity of the beam relative to the surface is such that at any scanned point on the surface, exposure duration is sufficiently short to ensure that the point responds to an integrated energy derived from the beam irradiance distribution acting at that point as the beam traverses that point.

12. The method as claimed in claim 11 in which said ring mode structure is circularly symmetrical.

13. The method as claimed in claim 12 in which the irradiance distribution of said mode structure comprises an outer ring and a central peak.

14. The method as claimed in claim 13 in which the mode structure comprises a combination of $TEM_{00}$ and $TEM_{01}^*$ modes.

15. The method as claimed in claim 11 in which the laser beam operates at a power below a level at which significant charring occurs.

16. The method as claimed in claim 11 in which the duration of laser beam exposure for any scanned point is not more than 10 milliseconds.

17. The method as claimed in claim 11 wherein beam width transverse to the scan direction and beam length in the scan direction are essentially the same.

18. The method as claimed in claim 11 wherein beam width transverse to the direction of scan is greater than a millimeter.

19. The method as claimed in claim 18 wherein the laser beam has a diameter and wherein the scanning velocity, in meters per second, exceeds 1/10 of the laser beam diameter, measured in millimeters.

20. The method as claimed in claim 12 wherein the scanning velocity is selected such that the material surface is free of response to peaks of the propagation mode structure of the beam profile.

21. The method as claimed in claim 20 wherein the scanning velocity is selected such that the beam profile has a duration at the point of less than about 10 milliseconds.

22. The method as claimed in claim 21 wherein the laser beam has a diameter and wherein the scanning velocity, in meters per second, exceeds 1/10 of the laser beam diameter, measured in millimeters.

* * * * *